Feb. 1, 1944. J. N. PALMER 2,340,486
MILK CAN
Filed Dec. 5, 1940
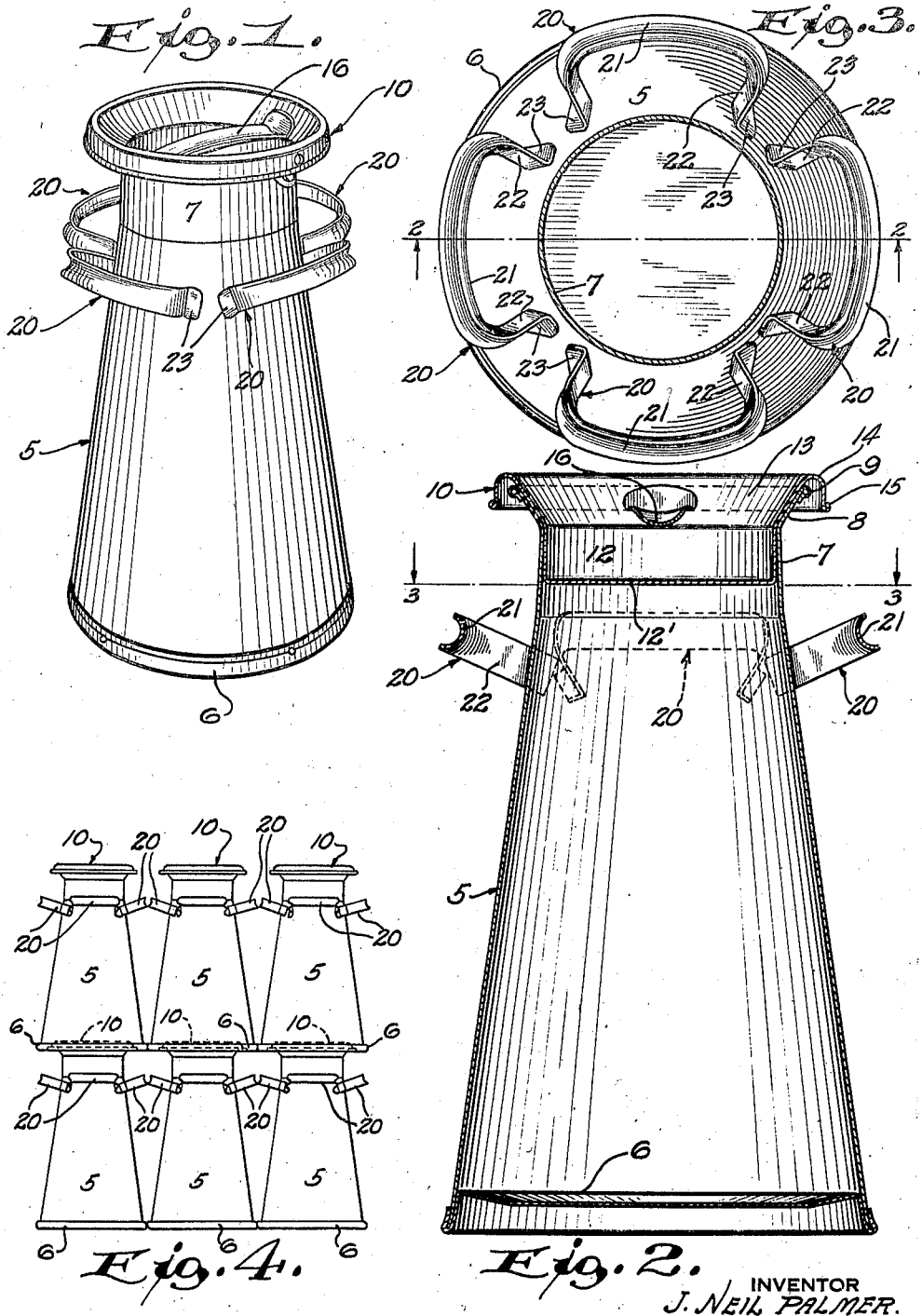
INVENTOR
J. NEIL PALMER.
BY John W. Michael
ATTORNEY.

Patented Feb. 1, 1944

2,340,486

UNITED STATES PATENT OFFICE 2,340,486

MILK CAN

J. Neil Palmer, Milwaukee, Wis., assignor to Geuder, Paeschke & Frey Co., Milwaukee, Wis., a corporation of Wisconsin Application December 5, 1940, Serial No. 368,598

2 Claims. (Cl. 220—97)

This invention relates to an improvement in milk cans.

One of the objects of the present invention is to provide a milk can which is so constituted as to provide a highly stable structure, not only when standing alone but also when stacked, so that tipping over of the can is practically precluded.

Another object of the invention is to provide a milk can of this character, and one which may be very conveniently handled in being moved from one place to another, or when being manipulated to pour the contents of the can therefrom. Pouring is much easier and much more convenient to control, and may be conveniently carried out to completely drain the can of its contents.

Another object of the invention is to provide a can which may be readily rolled when empty.

A still further object of the invention is to provide a can of this character and having these advantages, and which is sanitary, easy to clean and to inspect, presents a minimum of surfaces in contact with the milk and liable to be exposed to contamination, and which avoids the subjection of the milk to churning action at all times.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a perspective view of a milk can constructed in accordance with the present invention, the milk can being shown equipped with one type of cover;

Figure 2 is a view thereof in diametrical cross section, taken in the plane of line 2—2 of Figure 3;

Figure 3 is a view in horizontal cross section taken on line 3—3 of Figure 2 and looking in the direction of the arrows; and Figure 4 is a diagrammatic view in elevation illustrating how the handles of the milk cans interengage and coact to hold the cans against tipping when stacked.

Referring to the drawing it will be seen that a milk can embodying the present invention comprises a tapered body portion 5 constituted of sheet metal and having the form of a truncated hollow cone. A bottom 6 is interseamed with or otherwise suitably connected to the lower large end of the body portion 6. The bottom 6 is of inverted cupped formation so that in the assembly the bottom wall proper is inset from the bottom edge of the body portion 5 to adapt the can for stacking in the manner illustrated in Figure 4.

Integral with the upper smaller end of the frusto-conical body portion 5 of the can body is a contracted cylindrical neck portion 7 which merges into an outwardly and upwardly flaring throat section 8 having its upper edge formed with an outwardly rolled bead 9.

The can is preferably equipped with a combined plug-like closure and cover, designated generally at 10. The combined cover and closure 10 comprises a shell-like body portion, designated generally at 11, having a lower cylindrical section 12 of cylindrical form designed to snugly fit in the contracted cylindrical neck 7 of the milk can when the cover and closure 10 is applied thereto. The cylindrical section 12 is provided at its lower end with an integral bottom wall 12'. The shell-like body portion 11 also has an outwardly and upwardly flaring section 13 integral with the cylindrical section 12 and also integral with a cover flange 14 which is curved upwardly and then outwardly and downwardly and terminates in a rolled bead 15. In the assembly the cover flange overlies the beaded upper edge of the flared throat section 8 at the top of the can. A diametrically extending handle bar 16 is provided and is disposed within the confines of the combined cover and closure 10, its ends being engaged with the flared section 13 thereof and being welded, soldered or otherwise suitably connected thereto.

The tapered or conical body portion of the body of the can is provided adjacent its upper end with a circumferential series of bail-like handles 20. The handles 20 are similar in construction and are preferably four in number and are uniformly angularly spaced around the perimeter of the can.

Each bail-like handle 20 comprises an arc-like body portion 21 which is curved lengthwise along an arc of the same radius as the circle which defines the outer perimeter of the bottom 6 of the can. These body portions 21 are also transversely curved or of rounded channel-like formation to make them comfortable to the grip of the hand of the person handling the can. Integral with the body portion 21 of each handle are inwardly extending legs 22 which terminate in outturned feet or lugs 23 spot welded to the portions of the can with which they are engageable. The stock of which the legs 22 and lugs 23 are constituted may be left flat. The handles are so fashioned and so combined with the can that they angle upwardly and outwardly therefrom in the manner shown in the drawing. Any one of the handles may be conveniently gripped in one hand and the can may be lifted and allowed to rock about the handle so gripped and lifted. The rocking of the can may then be controlled by grasping the adjacent handle that is nearest the person lifting the can and then using the handle last gripped to swing or tilt the can as desired. The handles 20 not only have this advantage in facilitating the control of the can when lifting or pouring, but they also function very effectively to maintain the cans against tipping when stacked, since when the cans are stacked, as shown in Figure 4, the handles 20 of the cans in adjacent stacks interengage or interfit to effectively lock the stacks together. Then, again, since the arcuate body portion 21 of each handle 20 is in vertical alinement with the underlying portion of the bottom of the can, the can may be conveniently rolled with its axis horizontal and substantially parallel to the surface on which it is rolled. Finally, the handles 20 present an effective bumper which will preclude damage or injury to or distortion of the can.

The frustro-conical formation of the hollow body of the can renders it sanitary and easy to clean and inspect, and the structure is such that the milk, when poured into or out of the can, or if agitated therein, will not be subjected to a churning action.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A milk can of the character described comprising a shell-like body of frusto-conical form, a bottom closing the lower large end of the body and a series of uniformly, angularly spaced handles connected to the outside of the body adjacent its upper end and projecting outwardly and upwardly therefrom, said handles having outer gripping portions curved lengthwise along an arc of the same radius as the circle which defines the outer perimeter of said bottom, said portions being transversely curved to form a hand grip, said curved portions being of sufficient extent to provide a circular surface upon which the can may be rolled about its longitudinal axis.

2. A milk can of the character described comprising a shell-like body of frusto-conical form, a bottom closing the lower large end of the body and a series of uniformly, angularly spaced handles connected to the outside of the body adjacent its upper end and projecting outwardly and upwardly therefrom, said handles having outer gripping portions curved lengthwise along an arc of the same radius as the circle which defines the outer perimeter of said bottom, said curved portions being of sufficient extent to provide a circular surface upon which the can may be rolled about its longitudinal axis.

J. NEIL PALMER.